(12) United States Patent
An et al.

(10) Patent No.: US 10,640,070 B2
(45) Date of Patent: May 5, 2020

(54) AIRBAG ASSEMBLY

(71) Applicants: HYUNDAI MOTOR COMPANY, Seoul (KR); KIA MOTORS CORPORATION, Seoul (KR); Hyundai Mobis Co., Ltd., Seoul (KR)

(72) Inventors: Jae Hyun An, Suwon-si (KR); Seung Sik Han, Hwaseong-si (KR); Ik Jin Jung, Ansan-si (KR); Young Pyo Lee, Yongin-si (KR)

(73) Assignees: Hyundai Motor Company, Seoul (KR); Kia Motors Corporation, Seoul (KR); Hyundai Mobis Co., Ltd., Seoul (KR)

( * ) Notice: Subject to any disclaimer, the term of this patent is extended or adjusted under 35 U.S.C. 154(b) by 131 days.

(21) Appl. No.: 15/836,094

(22) Filed: Dec. 8, 2017

(65) Prior Publication Data
US 2018/0345898 A1     Dec. 6, 2018

(30) Foreign Application Priority Data
May 31, 2017   (KR) .................. 10-2017-0067836

(51) Int. Cl.
*B60R 21/215* (2011.01)
*B60R 21/217* (2011.01)

(52) U.S. Cl.
CPC .......... *B60R 21/215* (2013.01); *B60R 21/217* (2013.01); *B60R 2021/21506* (2013.01); *B60R 2021/21537* (2013.01)

(58) Field of Classification Search
CPC ... B60R 21/205; B60R 21/215; B60R 21/217; B60R 2021/21537; B60R 2021/21506
See application file for complete search history.

(56) References Cited

U.S. PATENT DOCUMENTS

| | | | | |
|---|---|---|---|---|
| 4,893,833 A | * | 1/1990 | DiSalvo | B60R 21/215 280/728.3 |
| 5,423,571 A | * | 6/1995 | Hawthorn | B60R 21/215 280/728.3 |
| 5,429,385 A | * | 7/1995 | Kamiji | B60R 21/201 280/728.3 |
| 5,439,246 A | * | 8/1995 | Ravenberg | B60R 21/215 280/728.3 |
| 7,210,700 B2 | * | 5/2007 | Zagrodnick | B60R 21/215 280/728.3 |

(Continued)

FOREIGN PATENT DOCUMENTS

KR    10-2005-0114489 A    12/2005

*Primary Examiner* — Frank B Vanaman
(74) *Attorney, Agent, or Firm* — Morgan, Lewis & Bockius LLP

(57) ABSTRACT

An airbag assembly, which is capable of facilitating a deployment of a deployment part when a passenger seat airbag is deployed, and preventing a damage of a hinge part includes: a deployment part turned and opened when an airbag disposed inside a crash pad is deployed; a hinge part fixing the deployment part to the crash pad; and a plurality of hinge protection structures formed at one end of the hinge part in order to set a deployment direction of the airbag. Each of the plurality of hinge protection structures may include a load pass hole formed at the opposite surface of a surface facing the airbag, and distributes stress applied to the hinge part when the airbag is deployed.

15 Claims, 4 Drawing Sheets

(56) References Cited

U.S. PATENT DOCUMENTS

| | | | | |
|---|---|---|---|---|
| 2009/0033073 A1* | 2/2009 | Kanno | ............... | B60R 21/205 |
| | | | | 280/728.3 |
| 2009/0066068 A1* | 3/2009 | Kanno | ............... | B60R 21/205 |
| | | | | 280/741 |
| 2010/0133793 A1* | 6/2010 | Kong | ............... | B60R 21/215 |
| | | | | 280/730.2 |
| 2013/0001932 A1* | 1/2013 | Kanno | ............... | B29C 65/06 |
| | | | | 280/728.3 |
| 2014/0375029 A1* | 12/2014 | Pauthier | ............ | B60R 21/215 |
| | | | | 280/728.3 |

\* cited by examiner

[FIG. 1] --RELATED ART--
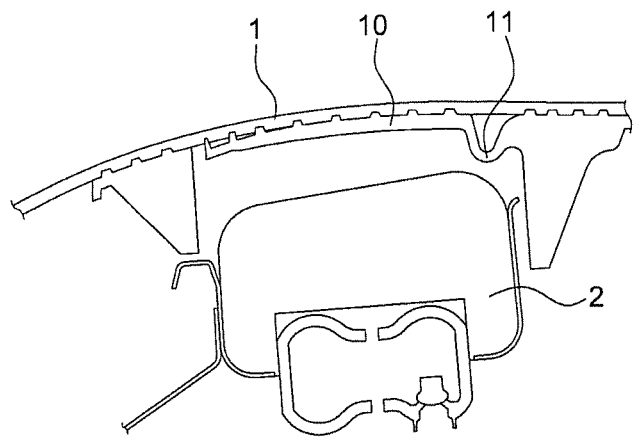
[FIG. 2]
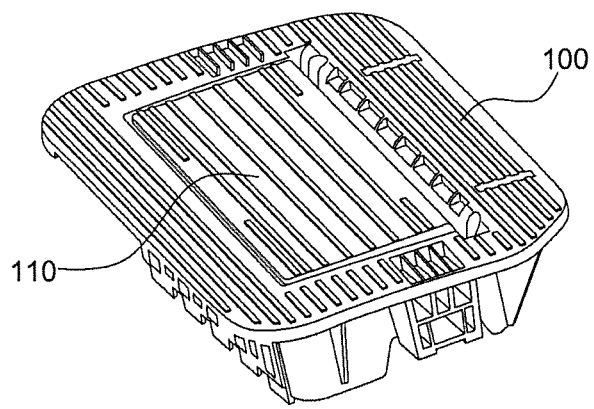

[FIG. 3]
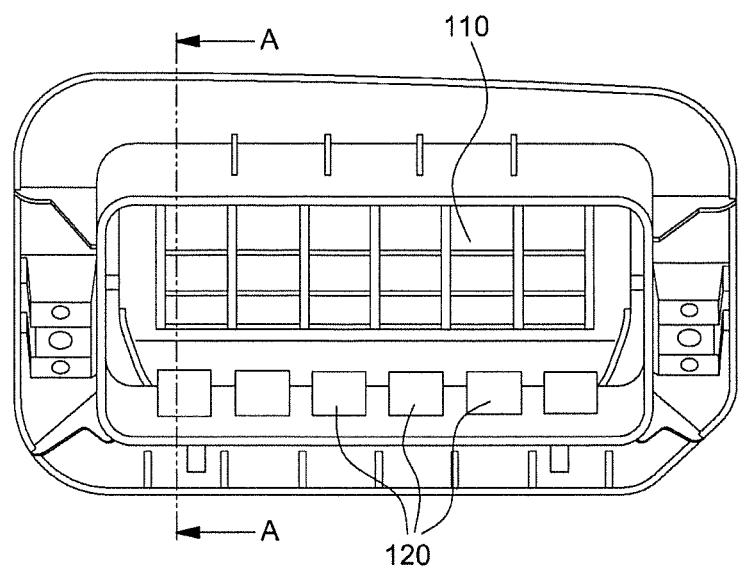
[FIG. 4]
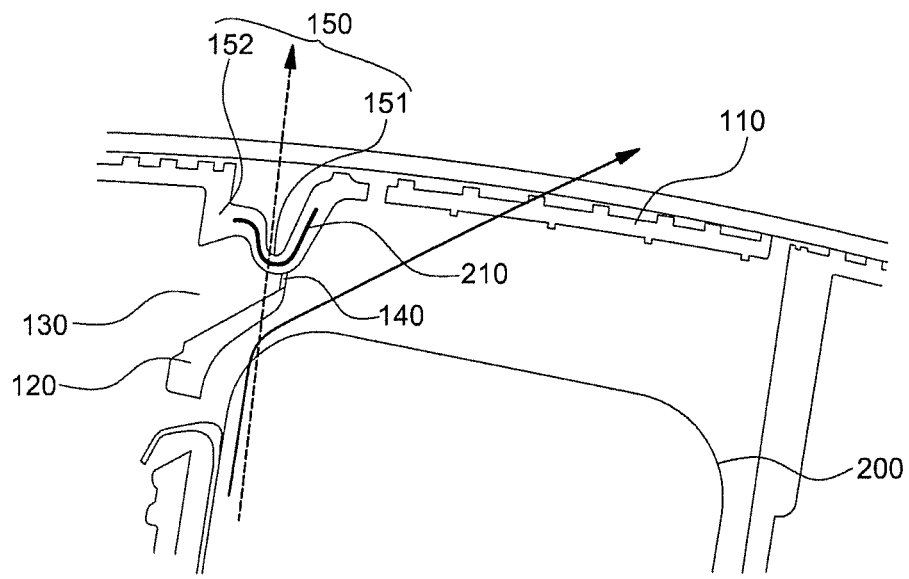

[FIG. 5]
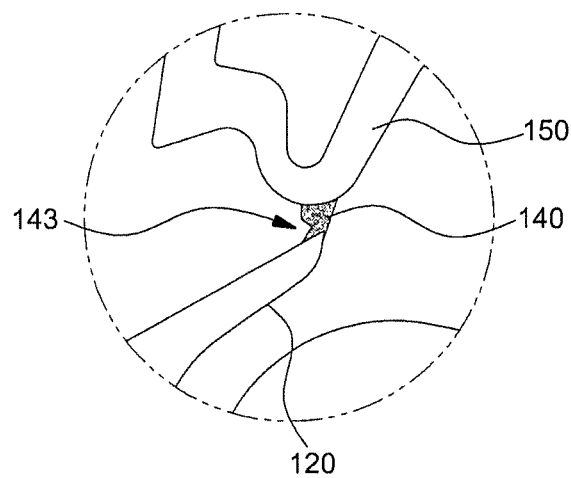
[FIG. 6]
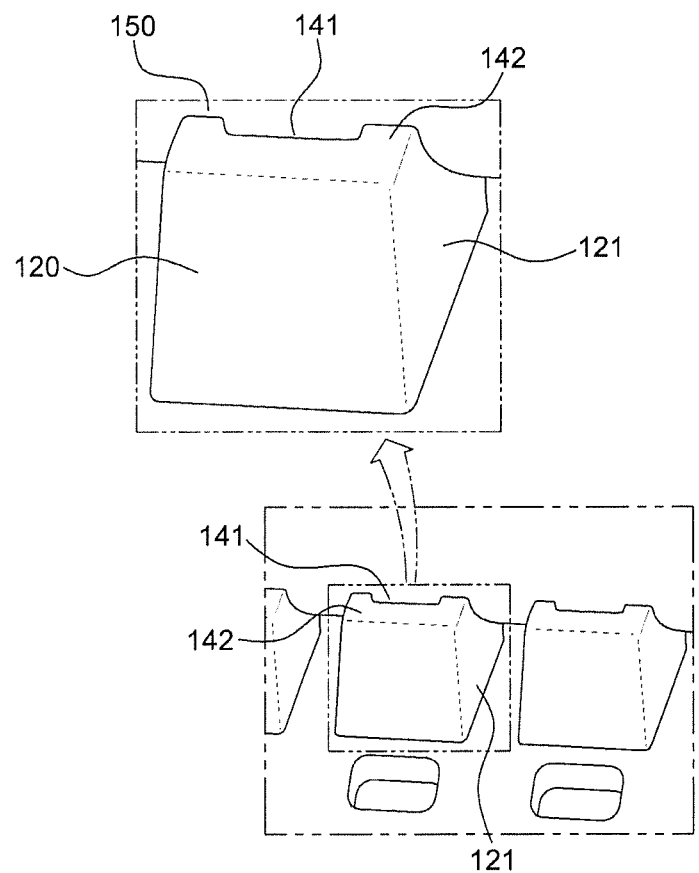

[FIG. 7]
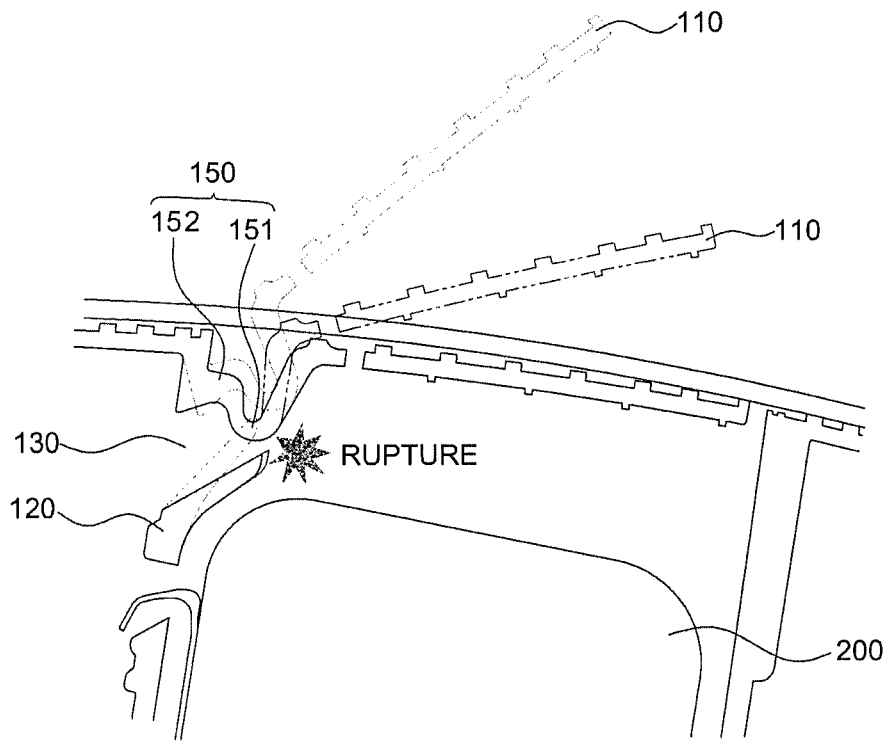
[FIG. 8]
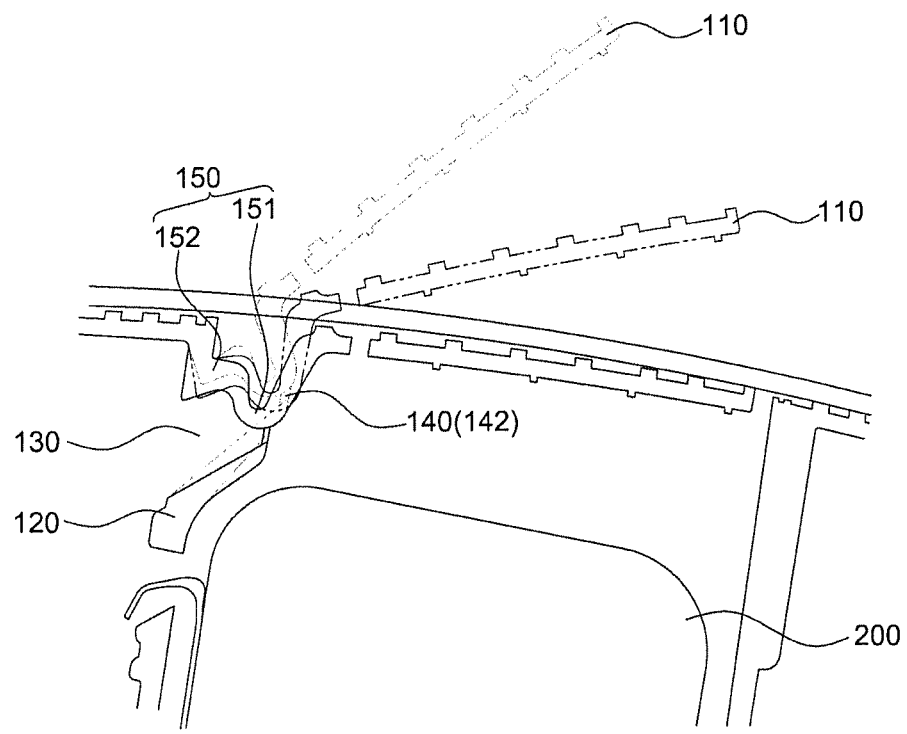

AIRBAG ASSEMBLY

CROSS-REFERENCE TO RELATED APPLICATION

This application is based on and claims under 35 U.S.C. § 119(a) the benefit of priority to Korean Patent Application No. 10-2017-0067836 filed on May 31, 2017 with the Korean Intellectual Property Office, the entire contents of which are incorporated herein by reference.

TECHNICAL FIELD

The present disclosure relates to an airbag assembly, and more particularly, to an airbag assembly

BACKGROUND

In general, an airbag mounted in a passenger seat includes an airbag module installed in a crash pad. When a vehicle collision occurs, the airbag is deployed to absorb a shock transmitted to a passenger, while an airbag door is opened.

The crash pad has an invisible airbag deployment part installed therein. The invisible airbag deployment part is integrated with the crash pad in order to improve an appearance of the crash pad, formed in such a manner that an airbag deployment line is not seen from outside, and has a skin deployment part formed in a skin layer such that a panel can be easily opened when the airbag deployment part is opened.

The airbag deployment line set in the airbag deployment part has a small thickness such that a weak portion is artificially formed in the crash pad. Thus, when the airbag is deployed, the airbag is opened along the airbag deployment line with the small thickness. In general, the invisible airbag deployment part may be formed in the small thickness along the airbag deployment line through injection molding, or manufactured by secondarily forming a minute groove using laser beams after injection molding of the crash pad.

FIG. 1 is a cross-sectional view illustrating a hinge structure for a deployment unit of a passenger seat airbag according to the related art. As illustrated in FIG. 1, a crash pad 1 is installed in front of a passenger seat in a vehicle body, and an airbag module 2 is disposed inside the crash pad 1 so as to be separated from the crash pad 1.

The airbag module 2 serves to deploy the airbag in case of a vehicle collision. As illustrated in FIG. 1, an airbag deployment part 10 having a hinge part 11 is installed on the inner surface of the crash pad 1 facing the airbag module 2.

The airbag deployment part 10 is typically welded to the inner surface of the crash pad 1, and an end of the airbag deployment part 10 in the opposite side of the hinge part 11 is cut. Thus, when the airbag is deployed, the airbag deployment part 10 is opened while being turned in the outward direction with respect to the hinge part 11 set to the center of rotation.

In the structure illustrated in FIG. 1, however, the entire airbag deployment part 10 is made of a single material, and applied to an airbag having a relatively low explosion pressure, like a depowered airbag used in Korea or Europe. Thus, if the airbag deployment part 10 is applied to an advanced airbag having a relatively high s explosion pressure and used in the US, the airbag deployment part 10 may not be normally opened or the hinge part may be damaged, when the airbag is deployed.

The above information disclosed in this Background section is only for enhancement of understanding of the background of the invention and therefore it may contain information that does not form the prior art that is already known in this country to a person of ordinary skill in the art.

SUMMARY

The present disclosure is proposed for solving the above problems and the object of the present disclosure is to provide an airbag assembly, which is capable of facilitating a deployment of a passenger seat airbag when the airbag is deployed.

Further, the object of the present disclosure is to provide an airbag assembly, which is capable of preventing a damage of a hinge part positioned inside a crash pad when the airbag is deployed.

Further, the object of the present disclosure is to provide an airbag assembly, which allows a deployment part to turn with respect to a plurality of hinge center points positioned on a hinge part.

The objects of the present disclosure are not limited to the above-described objects, and other objects and advantages of the present disclosure that have not been described will be understood by the following description, and become apparent with reference to the embodiments of the present disclosure. In addition, it will be appreciated that the objects and advantages of the present disclosure will be easily realized by means shown in the appended patent claims, and combinations thereof.

The hinge protection structure for achieving the above objects of the present disclosure includes the following constituents.

In one aspect, the present disclosure provides an airbag assembly, including: a deployment part turned and opened when an airbag disposed inside a crash pad is deployed; a hinge part fixing the deployment part to the crash pad; and a plurality of hinge protection structures formed at one end of the hinge part in order to set a deployment direction of the airbag, wherein each of the plurality of hinge protection structures comprises a load pass hole formed at an opposite surface of a surface facing the airbag, and distributes stress applied to the hinge part when the airbag is deployed.

In a preferred embodiment, the airbag assembly may further include a rupture induction structure positioned between one end of the hinge part and each of the plurality of hinge protection structures.

In another preferred embodiment, the hinge rupture induction structure may include: a rupture induction hole positioned between the one end of the hinge part and the hinge structure; and a support part positioned along the rupture induction hole so as to connect the hinge part and each of the plurality of hinge protection structures.

In still another preferred embodiment, the hinge part may include a double hinge protection structure, and may be constructed in such a manner that the deployment part is turned with respect to a first hinge close to the deployment part at a low temperature condition, and turned with respect to a second hinge far from the deployment part at a high temperature condition.

In yet another preferred embodiment, when the airbag is deployed at the low temperature condition, the deployment part may be turned with respect to the first hinge at a preset angle, and additionally turned with respect to the second hinge at an angle more than the preset angle.

In still yet another preferred embodiment, when the airbag is deployed at the high temperature condition, the deployment part may be turned with respect to the second hinge at a preset angle, and additionally turned with respect to the first hinge at an angle more than the preset angle.

In a further preferred embodiment, the support part may have a preset elongation at a high temperature condition, and provide a supporting force to the hinge part to turn and open the deployment part, when the airbag is deployed.

In another further preferred embodiment, when the hinge part is turned and opened, the load pass hole may absorb energy generated by the turning and opening of the deployment part.

In still another further preferred embodiment, the load pass hole may be formed to correspond to each of the plurality of hinge protection structures.

In yet another further preferred embodiment, the load pass hole may be surrounded by ribs extended from each of the plurality of hinge protection structures.

In still yet another further preferred embodiment, the support part may be ruptured at a low temperature condition, and provide a rotation degree of freedom to the hinge part when the airbag is deployed.

In a still further preferred embodiment, the hinge protection structure may further include a steel bracket positioned inside the hinge part.

In a yet still further preferred embodiment, the plurality of hinge protection structures may be positioned on a bottom surface of the hinge part and spaced with a same distance therebetween in a longitudinal direction of the hinge part.

In a yet still further preferred embodiment, the support part may include a cross-section reduction part positioned between the hinge part and each of the plurality of hinge protection structures, and the cross-section reduction part may be ruptured when the airbag is deployed at a low temperature condition.

In a yet still further preferred embodiment, the deployment part may have a two-door open structure.

The present disclosure may obtain the following effects through the above embodiments, and configuration, combination and their relationship that will be described hereinafter.

The present disclosure provides a structure that can easily turn and open a deployment part when a passenger seat airbag is deployed, and prevent a damage of a hinge part, thereby preventing a passenger's injury which may be caused by a separation of the deployment part.

The present disclosure provides an airbag assembly injection-molded as one body, thereby reducing a manufacturing cost.

Furthermore, the present disclosure provides a structure capable of facilitating a deployment of a deployment part at various temperature conditions.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein:

FIG. 1 is a cross-sectional view of a conventional structure in which stress is concentrated on a hinge part when an airbag is deployed;

FIG. 2 illustrates the top of an airbag assembly according to an embodiment of the present disclosure;

FIG. 3 illustrates the bottom of the airbag assembly according to the embodiment of the present disclosure;

FIG. 4 is a cross-sectional view of the airbag assembly according to the embodiment of the present disclosure;

FIG. 5 is an expanded view of a cross-section reduction part of a rupture induction structure according to an embodiment of the present disclosure;

FIG. 6 illustrates a hinge protection structure including a rupture induction structure according to the embodiment of the present disclosure;

FIG. 7 illustrates an operation of the hinge protection structure for the airbag, when the airbag is opened in a low temperature condition according to the embodiment of the present disclosure; and FIG. 8 illustrates an operation of the hinge protection structure for the airbag, when the airbag is opened in a high temperature condition according to the embodiment of the present disclosure.

It should be understood that the appended drawings are not necessarily to scale, presenting a somewhat simplified representation of various preferred features illustrative of the basic principles of the invention. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The terms "~a part" and "~module" described in the specification may indicate a unit for processing one or more functions or operations, and the unit can be implemented by hardware, software or a combination of hardware and software.

Furthermore, the terms "first" and "second" described in the specification are used to distinguish between elements when the elements have the same name, and the following descriptions are not limited to the order of the terms.

Moreover, the terms "energy" and "stress" described in the specification include all physical factors which are generated when an airbag is deployed.

The present disclosure relates to an airbag assembly for an airbag, and provides a technique for preventing a damage of a hinge and facilitating a deployment of a deployment part 110, while a passenger seat airbag positioned in a crash pad 100 is deployed.

FIG. 2 illustrates an airbag assembly mounted in a crash pad 100 according to an embodiment of the present disclosure.

The airbag assembly according to the embodiment of the present disclosure includes a chute, an airbag module 200, a deployment part 110 and a hinge part 150. The chute is formed through injection molding, the airbag module 200 is positioned in the chute, the deployment part 110 is turned and opened when the airbag is deployed, and the hinge part 150 is formed along the longitudinal direction of the chute in order to turn and open the deployment part 110.

The airbag assembly may further include a steel bracket 210 positioned along the hinge part 150 inside the hinge part 150, in order to prevent a separation of the deployment part 110.

More desirably, the deployment part 110 may have a one-door or two-door open structure.

That is, since an airbag module 200 is included in the airbag assembly including the deployment part 110, the airbag is deployed depending on a shock of the vehicle. More desirably, the airbag assembly including the hinge part 150 is constructed in such a manner that the airbag protrudes to the outside of the crash pad 100 while the deployment part 110 is turned and deployed with respect to the hinge part 150.

More desirably, since the airbag assembly can be molded as one body, the chute may be formed through a thermoplastic resin molding method, and the airbag module 200 may be integrated in the chute.

FIG. 3 illustrates the bottom surface of the airbag assembly including a hinge protection structure 120 for an airbag according to an embodiment of the present disclosure.

As illustrated in FIG. 3, the hinge protection structure 120 is formed on the bottom surface of the chute, in order to distribute stress concentrated on the hinge part 150 when the airbag is deployed.

The hinge protection structure 120 may be integrated with the chute through injection molding, or separately manufactured and coupled to the chute. More desirably, the hinge protection structure 120 is configured to cover the hinge part 150 positioned on the bottom surface of the chute. Thus, when the airbag is deployed, the hinge protection structure 120 serves to absorb stress applied to the hinge part 150, and distribute stress absorbed into a load pass hole 130.

The airbag assembly may include one or more hinge structures 120 arranged in the longitudinal direction of the hinge part 150. In this case, each of the hinge structures 120 may be include a plurality of ribs 121 to form the load pass hole 130. That is, the plurality of ribs 121 constituting the hinge protection structure 120 may include a predetermined space at the other surface of the hinge protection structure 120 which is in contact with the airbag. Thus, the load pass hole 130 is formed to distribute stress generated from the hinge part 150 when the airbag is deployed.

FIG. 4 is a side cross-sectional view of the airbag assembly according to the embodiment of the present disclosure.

Referring to FIG. 4 which is a side cross-sectional view taken along the line A-A of FIG. 3, the airbag assembly includes the deployment part 110 integrated with the crash pad 100. More desirably, the deployment part 110 may be injection-molded through the airbag assembly, such that the deployment part 110 has a small thickness along an airbag deployment line. After the crash pad 100 is injection-molded, a minute groove may be formed through a secondary process using laser beams. Then, the deployment part 110 may be turned and opened when the airbag is deployed.

The airbag assembly according to the present embodiment may include the hinge part 150 connected to one end of the deployment part 110. Thus, according to an embodiment of the present disclosure, the airbag assembly may include a double hinge protection structure which has a different center of rotation depending on a temperature condition. More desirably, the deployment part 110 may be turned and opened through a first hinge 151 close to the deployment part 110 under a low temperature condition, or turned and opened through a second hinge 152 far from the deployment part 110 and positioned at one end of the hinge part 150 under a high temperature condition.

When the airbag is opened at a low temperature condition, the deployment part 110 is preferentially turned with respect to the first hinge 151 close to the deployment part 110. When the deployment part 110 is turned at a predetermined angle or more, the deployment part 110 is turned with respect to the second hinge 152 and thus completely opened.

Furthermore, when the airbag is opened at a high temperature condition, the deployment part 110 may be preferentially turned with respect to the second hinge 152. When the deployment part 110 is turned at the predetermined angle or more, the deployment part 110 may be additionally turned with respect to the first hinge 151 and thus completely opened.

According to the present embodiment, the one or more hinge structures 120 may be formed under the hinge part 150 in order to induce the airbag deployment direction, and a rupture induction structure may be formed at a position connecting the hinge protection structure 120 and the hinge part 150.

More desirably, the plurality of hinge structures 120 may be positioned at a lower end of the hinge part 150 while maintaining the same gap therebetween. Thus, when the airbag is deployed, the deployment direction of the airbag facing the hinge part 150 may be induced.

The rupture induction structure according to the present embodiment includes a rupture induction hole 141 and a support part 142 positioned around the rupture induction hole 141 so as to connect the hinge part 150 and the hinge protection structure 120. More desirably, when the airbag is deployed under the low temperature condition or high temperature condition, the support part 142 is ruptured, and the deployment part 110 is deployed.

The support part 142 may be made of a material having a preset elongation. When the deployment part 110 is turned and opened at a high temperature condition, the support part 142 may be extended in such a manner that the connection between the hinge part 150 and the hinge protection structure 120 is maintained.

The rupture induction structure 140 formed through injection molding is made of a material which has a preset elongation under a high temperature condition and has brittleness under the low temperature condition. More desirably, the airbag assembly according to the present embodiment may be injection-molded as one body. Thus, the chute may be made of a material which has a preset elongation at a high temperature condition and has brittleness at low and high temperature conditions.

In an embodiment of the present disclosure, the material used for injection-molding the airbag assembly may have an elongation of 800%±150 at a high temperature condition of 85° C. or more, and have brittleness at a temperature condition equal to or lower than room temperature.

More desirably, the material forming the airbag assembly according to the present embodiment may have an elongation of 120%±50 at a temperature of −40° C., have an elongation of 540%±150 at room temperature (25° C.), or have an elongation of 800%±150 at a temperature of 85° C.

Furthermore, the material forming the airbag assembly may have a tensile strength of 25 MPa±5 at −40° C., have a tensile strength of 15 Mpa±5 at 23° C., or have a tensile strength of 10 Mpa±5 at 85° C.

Therefore, when the airbag is deployed under a high temperature condition, the support part 142 of the rupture induction structure 140 is extended. Thus, the deployment part 110 is turned and opened with respect to the second hinge 152.

More desirably, when the deployment part 110 is turned with respect to the second hinge 152, energy generated in the airbag assembly by the turn of the deployment part 110 is absorbed into the load pass hole 130. Furthermore, ruptures of the side ribs of the hinge structures 120 by which the respective load pass holes 130 are distinguished may be induced.

On the other hand, the rupture induction structure 140 positioned at one end of the support part 142 is ruptured at a low temperature condition equal to or less than the room temperature condition. Thus, the one end of the hinge part 150 and the hinge protection structure 120 are separated from each other, and the deployment part 110 is turned and opened with respect to the first hinge 151.

As described above, the deployment part 110 may be turned and opened depending on a temperature condition. Thus, the size of the rupture induction hole 141, the connection between the components of the support part 142, and the number of the hinge structures 120 including the rupture induction structure 140 may be differently set depending on a structure to which the airbag assembly is applied.

FIG. 5 is an expanded view of the rupture induction structure 140 according to the embodiment of the present disclosure.

As illustrated in FIG. 5, the rupture induction structure 140 formed at the one end of the support part 142 is positioned between the lower end of the hinge part 150 and one end of the hinge protection structure 120, and includes a cross-section reduction part 143 formed on the opposite surface of the surface where the airbag is deployed.

The cross-section reduction part 143 has a minimum cross-section of which the size can be changed depending on a driving environment of a vehicle to which the airbag assembly is applied. Thus, the rupture induction structure 140 may be ruptured under a low temperature condition less than a preset temperature, and extended under a high temperature condition equal to or more than the preset temperature.

More desirably, the cross-section reduction part 143 has a smaller cross-section than one end of the minimum cross-section of the hinge protection structure 120, and is connected to the bottom surface of the hinge part 150. Thus, when the airbag is deployed, the cross-section reduction part 143 may be ruptured or extended depending on a temperature condition.

FIG. 6 is an expanded view of the hinge protection structure 120 including the rupture induction structure 140 according to the embodiment of the present disclosure.

The hinge protection structure 120 may be positioned with a predetermined slope which can induce the deployment direction of the airbag, and one or more hinge structures 120 may be formed along the bottom surface of the hinge part 150. Furthermore, the hinge protection structure 120 includes the rupture induction structure 140 positioned at one end thereof, and is connected to the one end of the hinge part 150. More desirably, the rupture induction structure 140 includes the rupture induction hole 141 and the support part 142 surrounding the rupture induction hole 141. Thus, when the airbag is deployed, the deployment part 110 is turned and opened with respect to the hinge part 150.

The hinge protection structure 120 includes the load pass hole 130 for distributing stress formed in the hinge part 150 when the airbag is deployed. The load pass hole 130 may be positioned between the side ribs 121 forming the hinge structures 120.

Therefore, the load pass hole 130 serves to absorb and distribute stress applied to the surface of the hinge protection structure 120 when the airbag is deployed. When the deployment part 110 is turned and opened, the load pass hole 130 absorbs deployment energy generated in the hinge part 150.

More desirably, the load pass hole 130 is positioned inside the hinge protection structure 120, and the rupture induction structure 140 is formed to correspond to each of the hinge structures 120. However, the number of the hinge structures 120 and the number of the load pass holes 130 may be set to different values in consideration of an environment applied to the vehicle.

FIG. 7 illustrates that the airbag is deployed at a room temperature condition (low temperature condition) according to the embodiment of the present disclosure.

The room temperature condition or the low temperature condition indicates a condition in which the airbag is deployed at a temperature of less than 85° C. When the airbag is opened under the above-described condition, the rupture induction structure 140 is ruptured because the material used for injection-molding the airbag assembly has brittleness under the room temperature condition or the low temperature condition. More desirably, the material forming the rupture induction structure 140 according to the present embodiment may have brittleness under the room temperature condition, such that the support part 142 can be ruptured by stress generated while the airbag is deployed.

When the rupture induction structure 140 is ruptured, the lower end of the hinge part 150 and the upper end of the hinge protection structure 120 are separated from each other, and the deployment part 110 is turned with respect to the hinge part 150.

More desirably, when the airbag is deployed under the low temperature condition, the airbag deployment direction is induced by the hinge protection structure 120, the cross-section reduction part 143 of the rupture induction structure 140 is ruptured by stress generated in the hinge protection structure 120, and the deployment part 110 is turned with respect to the first hinge 151 close to the deployment part 110. That is, the hinge protection structure 120 and the hinge part 150 are separated from each other through the rupture of the rupture induction structure 140, and the rotation degree of freedom of the separated hinge part 150 is applied to turn the deployment part 110 with respect to the hinge part 150 along the airbag deployment direction.

Furthermore, when the deployment part 110 is turned at a predetermined angle or more with respect to the first hinge 151, the deployment part 110 may be additionally turned with respect to the second hinge 152. That is, the hinge protection structure 120 may include a double center structure.

The deployment force generated when the airbag is deployed (stress generated in the hinge protection structure 120) and the energy (stress) generated while the deployment part 110 is turned by a rupture of the rupture induction structure 140 are absorbed into the load pass hole 130 positioned at the inner surface of the hinge protection structure 120.

FIG. 8 illustrates that the airbag is deployed at a high temperature condition according to the embodiment of the present disclosure.

The high temperature condition described in the present embodiment indicates a condition in which the airbag is deployed at a temperature of 85° C. or more. Therefore, when the temperature is equal to or more than 85° C. as an environmental condition during the deployment of the airbag, the chute or airbag assembly formed through the thermoplastic resin injection molding method has an elongation of 800%±150. When the deployment part 110 is turned according to the deployment of the airbag, the rupture induction structure 140 is extended to maintain the connection between the hinge part 150 and the hinge protection structure 120.

Specifically, when the airbag is deployed, the support part 142 or the cross-section reduction part 143 of the rupture induction structure 140 is extended to maintain the connection between the hinge part 150 and the hinge protection structure 120. Thus, the deployment part 110 is turned with respect to the second hinge 152.

More desirably, the deployment part 110 is turned at a predetermined angle with respect to the second hinge 152. When the deployment part 110 is turned at the predetermined angle or more, the deployment part 110 is additionally turned with respect to the first hinge 151. That is, the deployment part 110 may include a double turn structure.

Furthermore, the second hinge 152 is located at a farther position from the deployment part 110 than the first hinge 151. Thus, the energy generated by the turn is distributed into the load pass hole 130 located under the second hinge 152.

More desirably, the stress generated in the rupture induction structure 140 when the airbag is deployed at a high temperature condition and the energy formed while the deployment part 110 is turned with respect to the second hinge 152 may be transmitted along the load pass hole 130, and transmitted to the ribs 121 positioned at the side surface of the hinge protection structure 120.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An airbag assembly, comprising:
   a deployment part turned and opened when an airbag disposed inside a crash pad is deployed;
   a hinge part fixing the deployment part to the crash pad; and
   a plurality of hinge protection structures formed at one end of the hinge part in order to set a deployment direction of the airbag,
   wherein each of the plurality of hinge protection structures comprises a surface facing the airbag and a load pass hole formed at an opposite surface of the surface facing the airbag, and distributes stress applied to the hinge part when the airbag is deployed,
   wherein the hinge part comprises a double hinge protection structure, and is constructed in such a manner that the deployment part is turned with respect to a first hinge at a low temperature condition and turned with respect to a second hinge at a high temperature condition.

2. The airbag assembly of claim 1, further comprising a rupture induction structure positioned between one end of the hinge part and each of the plurality of hinge protection structures.

3. The airbag assembly of claim 2, wherein the rupture induction structure comprises:
   a rupture induction hole positioned between the one end of the hinge part and each of the plurality of hinge protection structures; and
   a support part positioned along the rupture induction hole so as to connect the hinge part and each of the plurality of hinge protection structures.

4. The airbag assembly of claim 3, wherein the support part is ruptured at the low temperature condition, and provides a rotation degree of freedom to the hinge part when the airbag is deployed.

5. The airbag assembly of claim 3, wherein the support part comprises a cross-section reduction part positioned between the hinge part and each of the plurality of hinge protection structures, and
   the cross-section reduction part is ruptured when the airbag is deployed at the low temperature condition.

6. The airbag assembly of claim 3, wherein the support part has a preset elongation at the high temperature condition, and provides a supporting force to the hinge part to turn and open the deployment part, when the airbag is deployed.

7. The airbag assembly of claim 6, wherein when the hinge part is turned and opened, the load pass hole absorbs energy generated by the turning and opening of the deployment part.

8. The airbag assembly of claim 1, wherein the first hinge is close to the deployment part, and the second hinge is far from the deployment part.

9. The airbag assembly of claim 8, wherein when the airbag is deployed at the low temperature condition, the deployment part is turned with respect to the first hinge at a preset angle, and additionally turned with respect to the second hinge at an angle more than the preset angle.

10. The airbag assembly of claim 8, wherein when the airbag is deployed at the high temperature condition, the deployment part is turned with respect to the second hinge at a preset angle, and additionally turned with respect to the first hinge at an angle more than the preset angle.

11. The airbag assembly of claim 1, wherein the load pass hole is formed to correspond to each of the plurality of hinge protection structures.

12. The airbag assembly of claim 11, wherein the load pass hole is surrounded by ribs extended from each of the plurality of hinge protection structures.

13. The airbag assembly of claim 1, further comprising a steel bracket positioned inside the hinge part.

14. The airbag assembly of claim 1, wherein the plurality of hinge protection structures are positioned on a bottom surface of the hinge part and spaced with a same distance therebetween in a longitudinal direction of the hinge part.

15. The airbag assembly of claim 1, wherein the deployment part has a two-door open structure.

* * * * *